May 18, 1926.
W. E. CHENOT
1,584,730
METHOD AND APPARATUS FOR DISTILLATION
Filed April 22 1924   2 Sheets-Sheet 1
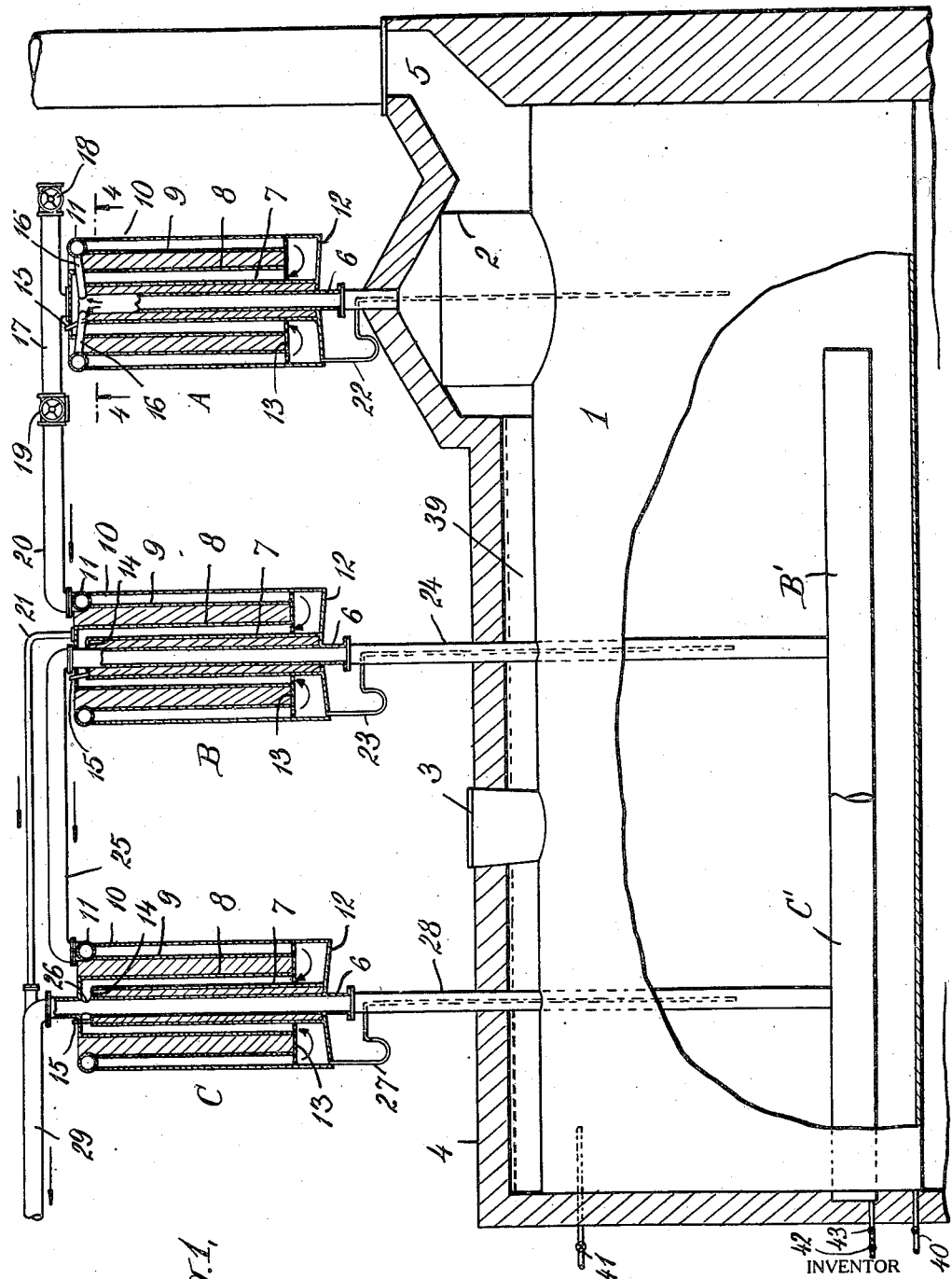

May 18, 1926. 1,584,730
W. E. CHENOT
METHOD AND APPARATUS FOR DISTILLATION
Filed April 22, 1924  2 Sheets-Sheet 2
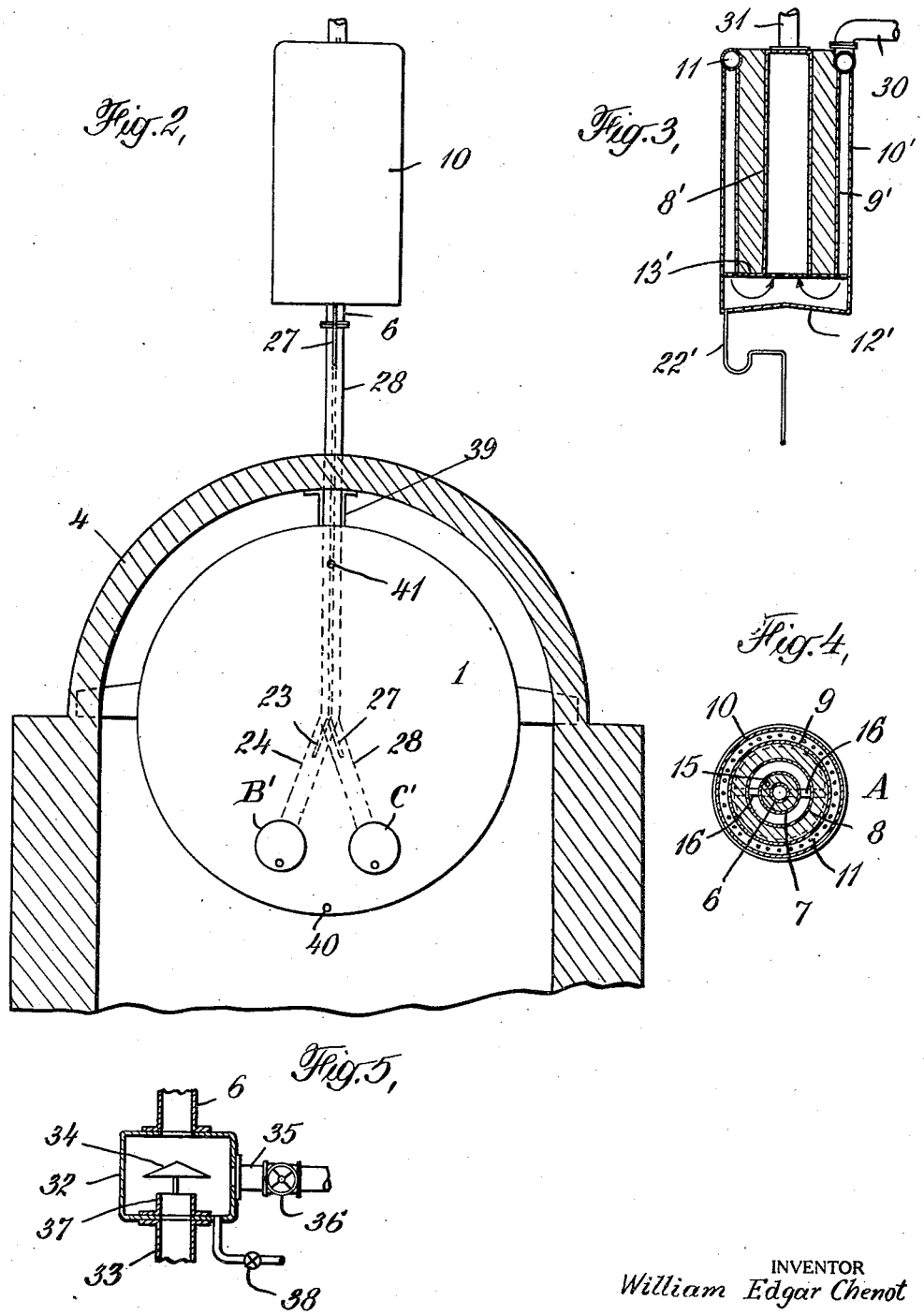
INVENTOR
William Edgar Chenot
BY
ATTORNEYS Patented May 18, 1926.

1,584,730

UNITED STATES PATENT OFFICE.

WILLIAM EDGAR CHENOT, OF BELLEVILLE, ILLINOIS.

METHOD AND APPARATUS FOR DISTILLATION.

Application filed April 22, 1924. Serial No. 708,150.

This invention relates to an improved method and apparatus for refining and fractionating hydrocarbon oils. The invention relates, more particularly, to the separation and recovery of gasoline or gasoline character fractions from oils such as crude petroleum, distillates containing gasoline, and the like.

Hitherto, in refining hydrocarbon oils it has been customary to subject the oil to a series of separate distillations and redistillations to separate the oil into the fractions desired. The initial separation is usually effected by simple distillation, but, on a commercial scale, the cuts so obtained are not sufficiently distinct, and it has been necessary to subject each of the separate fractions to a more or less extended series of further distillations in order to obtain cuts or fractions suitable for commercial purposes. Such further treatment has involved additional time, labor and apparatus.

Among the objects of the present invention are the simple and direct separation of hydrocarbon oils into accurate fractions as desired in a single operation, the elimination of losses in the separation, and the provision of a simple and efficient apparatus for effecting such separation.

According to this invention, hydrocarbon oils are subjected to a combined fractional distillation and fractional condensation treatment whereby the oil is fractionated or separated directly into accurate and closely controlled cuts in a single operation.

According to the method of the invention, the condensate is subjected to a successive series of distillations and condensations whereby the fraction or fractions finally separated are of accurately defined boiling range. The oil is distilled and the vapors are subjected to a dephlegmation treatment. The liquid condensate so obtained is subjected to a revaporization treatment by heat interchange with the original body of oil undergoing distillation but without being brought into direct contact therewith. The vapors of the revaporized condensate are again subjected to a dephlegmation treatment and the condensate again subjected to a revaporization treatment by heat interchange with the original body of oil in a similar manner. The vapors may be subjected to further successive dephlegmation treatments and redistillation treatments in like manner where it is necessary or desirable to secure a more closely limited final fraction or a greater number of fractions. The vapors remaining after each dephlegmation treatment are withdrawn and collected without further contact with the oil undergoing distillation or the vapors undergoing condensation in the successive steps of the operation. By directly returning for revaporization the condensate collected from the dephlegmation treatments without substantial cooling below the point of condensation, the loss of heat involved in redistillation of the condensate is minimized. By removing the lighter vapors without permitting them to recontact with the oil or oil vapors undergoing treatment, contamination of the vapors and decomposition or loss due to further heating of the vapors is avoided.

The process of the invention can be carried out as a continuous process or as a batch process. Where the process is carried out as a batch operation, the end boiling point of the final vapors, after the last dephlegmation and revaporization, gradually increases as the operation proceeds and fractions of any desired boiling range can be separately collected by making successive cuts as the distillation progresses. Separate fractions may also be collected by withdrawing part of the intermediate condensate formed during the operation. Where the process is carried out as a continuous operation, the initial charge of oil undergoing distillation is maintained by the addition of fresh oil thereto and the successive partial condensations are so regulated that the final vapors collected comprise the fraction of the desired composition. The character of this fraction may be maintained substantially uniform throughout the operation. Intermediate fractions can be collected by withdrawing part of the intermediate condensates or the unvaporized residues. The intermediate condensates are not as accurately defined fractions as that fraction comprising the final vapors from the operation and these intermediate condensates may be subjected to redistillation. It will be noted, however, that but a single and direct operation is required, according to this invention, to secure each individual cut in final form, although separate distillations may be required for separate cuts. In continuous operation, the fresh oil supplied may be preheated, for example, by heat exchange with residues or fractions withdrawn from the operation or by heat exchange with waste stack gases.

Where the intermediate fractions separated during the operation are further fractionated, they may be treated in the same manner as the oil originally subjected to distillation, or they may be redistilled in the ordinary manner. Where a higher yield of lower boiling fractions is desired, the intermediate and heavier fractions may be subjected to cracking treatment.

The apparatus of the invention comprises a still, a series of separate vaporizing receptacles adapted to be heated by the oil undergoing distillation in the still, a series of dephlegmators and means to conduct the vapors from the still and from each of the vaporizing chambers except the last to one of the dephlegmators, means to conduct the condensate from each dephlegmator to the next vaporizing receptacle in the series and means to collect and remove the uncondensed vapors from each of the dephlegmators and from each vaporizing receptacle. In combination with a shell still, the apparatus of the invention may comprise two or more closed vaporizing receptacles within the still and below the normal liquid level therein, a series of dephlegmators, either above or to one side of the still, one communicating with the vapor space of the shell still and one with the vapor space of each of the vaporizing receptacles except the last, connections for conducting the condensate from the first dephlegmator to the still, connections for conducting the condensate from the first dephlegmator to the second revaporizing receptacle, etc. Connections are also provided for withdrawing the remaining uncondensed vapors from each dephlegmator and from the last vaporizing receptacle without further contact or heat exchange with the partial condensate or the vapors undergoing condensation and conducting them to a final condenser. An additional dephlegmator may be interposed between the vapor space on the still and the first dephlegmator from which condensate is conducted to one of the separate vaporizing receptacles within the still, and connections provided for returning the condensate from this interposed dephlegmator directly to the still. The vapors from such an interposed dephlegmator are then conducted to the next dephlegmator and the vapors from the following dephlegmators in the series separately collected and conducted away for condensation together with the vapors from the last vaporizing receptacle. The shell still may be supported and heated in a furnace housing of ordinary type but I find it more advantageous to arrange the shell still in a manner such that the entire surface of the still is subjected to the heating gases.

In the improved dephlegmator of the invention, the vapors are discharged downwardly through a series of equalizing perforations into an annular space adapted to be externally cooled and in which they undergo partial condensation. At the bottom of this annulus the flow of vapors is reversed, the downwardly moving particles or films of condensate separated, and the remaining vapors passed upwardly through a passage in the annulus but without substantial heat interchange with the vapors undergoing condensation therein. The dephlegmator may comprise a series of substantially concentric sheet metal cylinders, a circular pipe at the upper end of the outer two cylinders welded thereto and having a series of perforations opening downwardly into the space between the two cylinders and a vapor inlet connection to the pipe, a wall of heat insulating material between the second and third cylinders and supported on an annular sheet metal ring welded to and closing the bottom of the second and third cylinders, and a vapor exit connection communicating with the interior of the third cylinder. Where the improved dephlegmator is employed superposed above a still, it may be arranged about a pipe projecting from the still passing centrally through the dephlegmator and surrounded within the dephlegmator by a suitable heat insulating wall.

The invention will be further described in connection with the accompanying drawings in which I have shown apparatus embodying the invention and adapted for use in carrying out the process of the invention. It will be understood, however, that this specific illustration and the following description are for the purpose of illustrating the invention but that the invention is not limited thereby.

In the accompanying drawings:

Fig. 1 represents a fragmentary view, partly in section and partly in elevation, of an improved distilling apparatus embodying the invention and adapted for use in carrying out the process of the invention, Fig. 2 is a fragmentary end view, partly in section and partly in elevation, of the still structure shown in Fig. 1, Fig. 3 is a vertical section of a modified form of dephlegmator embodying the invention, Fig. 4 is a horizontal section on the line 4—4 of Fig. 1, and Fig. 5 is an enlarged section of a modified form of connection for use between the still, or between the vaporizing receptacles therein, and the dephlegmator connected thereto.

Referring to the drawings, 1 is the primary still, in which the initial distillation takes place, and 2 is the dome of the primary still, communicating with the vapor space of the still, and through which the vapors escaping from the still pass. The still is provided with a manhole 3 for the purpose of cleaning and inspection. The still is also provided with the customary safety appliances and temperature measuring instruments. The primary still is supported within a housing 4 entirely inclosing the still and adapted for conserving the heat of the heating gases. The still is heated by hot products of combustion from a furnace (not shown) below the still in which coal, oil or gas is burned. The hot products of combustion from the furnace pass around the surface of the still shell and, after giving up their heat to the oil within the still through the shell, escape through the stack flue 5. The top arch of the still housing 4 is supported upon angle irons 39 extending longitudinally of the still shell.

The dephlegmators above the still are in general of the same construction and will be separately described only in so far as they differ from each other. In general, the dephlegmators comprise a central pipe 6, about which they are supported and through which vapors pass, surrounded by a series of concentric sheet metal cylinders 7, 8, 9 and 10. The vapors are discharged into the dephlegmator through a circular pipe 11 at the upper end of the cylinders 9 and 10 through a series of perforations in the lower side of the pipe 11 in the space between the cylinders 9 and 10. The vapors entering the dephlegmator from the pipe 11 through the distributing and equalizing perforations are distributed throughout the annular space between the outer two cylinders and pass downwardly therebetween. The outer cylinder 10 is closed at its lower end by means of the circular plate 12 which is sloped toward its outer edge to facilitate the collection and removal of the condensate formed within the dephlegmator. The cylinders 8 and 9 are closed at their lower ends by means of an annular disc 13 welded thereto, and the space between these cylinders is filled with a suitable insulating material, such as mineral wool or asbestos felt, to prevent the interchange of heat between the annular chamber between the cylinders 9 and 10 and the chamber enclosed by the cylinder 8. The uniform distribution of vapors may be further promoted by the provision of perforated extensions on the disc 13 disposed across the annular spaces between the cylinders 7 and 8 and 9 and 10 respectively. The cylinder 7 is welded to the disc 12 at its lower end and extends upwardly through the cylinder 8, being closed at its upper end by an annular disc 14. The space between the cylinder 7 and the pipe 6 is filled with heat insulating material and a small pipe 15 is provided communicating between the atmosphere and the space between the cylinder 7 and the pipe 6 to allow for expansion when the apparatus is heated up. The cylinder 7 is closed after the insertion of the insulating material. A closure may also be provided at the upper end of the insulation between cylinders 8 and 9 to protect this insulation.

The differences in the structure of the successive dephlegmators of the series will be pointed out in describing the path of the vapors therethrough. The flow of the vapors is indicated by arrows in the drawings. The vapors from the dome 2 on the primary still enter the circular perforated pipe 11 in the first dephlegmator A through a pair of cross pipes 16 connecting the upper closed end of the pipe 6 and the circular pipe 11, and then pass downwardly through the externally cooled space between the cylinders 9 and 10, undergoing partial condensation, the uncondensed lighter vapors passing downwardly through the perforations in the outer edge of the disc 13 and then upwardly through the inner ring of perforations through the space between the cylinders 7 and 8 and escaping from the upper end thereof into the pipe 17. A valve 19 is provided in the connection between the pipe 17 and the second dephlegmator B, which, in conjunction with valve 18, permits the separate withdrawal of the vapors from the first dephlegmator A through the valve 18. The vapors passing from the first dephlegmator A through pipe 17 and valve 19 enter the circular distributing pipe 11 at the top of the second dephlegmator B through connection 20. In the dephlegmator B the vapors flow downwardly between the cylinders 9 and 10, undergoing partial condensation, and the remaining uncondensed vapors pass through the perforations in the disc 13 then upwardly between the cylinders 7 and 8 escaping through the connection 21. The condensate formed in the first dephlegmator A is returned to the primary still through the pipe 22, which is provided with a trap to prevent the escape of vapors therethrough Within the primary still, and below the normal liquid level therein, two closed cylindrical revaporizing receptacles, B' and C' are provided. The condensate from the second dephlegmator B is returned to the first revaporizing receptacle B' through connection 23 and the vapors from the receptacle B' are passed to the distributing pipe 11 in the third dephlegmator C through the connection 24, communicating with the vapor space in the receptacle B', and the connection 25 connecting the upper end of the pipe 6 in the second dephlegmator B to which the pipe 24 connects. In the third dephlegmator C the vapors from the distributing pipe 11 pass downwardly between the cylinders 9 and 10, undergoing condensation, the uncondensed vapors escaping upwardly through the perforations in the disc 13 through the space between the cylinders 7 and 8 into the upper end of the pipe 6 in the dephlegmator C through apertures 26. The condensate collecting in the third dephlegmator C is passed to the revaporizing receptacle C' through connection 27. The vapors from the revaporizing receptacle C' pass upwardly through connection 28, communicating with the vapor space of the receptacle C', and the pipe 6 in the third dephlegmator C. The vapors from the receptacle C' and the uncondensed vapors escaping from the second and third dephlegmators, B and C, are thus mingled in the connection 29 through which they are conducted to a final condenser (not shown) of any suitable or approved form.

Dephlegmators of the construction illustrated in Fig. 1 are particularly adapted to be mounted above a primary still of the shell type. Where the dephlegmators are arranged away from the still or on supports separate from the still, a dephlegmator of the modified construction illustrated in Fig. 3 may be employed with advantage. In this dephlegmator structure the vapors entering the dephlegmator through connection 30 are discharged downwardly in the space between the cylinders 9' and 10' through a circular distributing pipe 11' connecting the upper ends of and welded to the cylinders 9' and 10'. The cylinder 10' is adapted to be cooled externally and vapors passing downwardly between the cylinders 9' and 10' undergo partial condensation, the condensate collecting in the chamber formed by the circular disc 12' welded to and closing the lower end of the cylinder 10'. The bottom 12' of the dephlegmator is dished inwardly slightly to facilitate the removal of the condensate through connection 22'. The remaining uncondensed vapors pass upwardly through the central cylinder 8', and escape through connection 31. The lower ends of the cylinders 8' and 9' are closed by an annular disc 13' welded thereto, and a wall of insulating material is supported thereon between the cylinders 8' and 9'. The uniform distribution of vapors may be further promoted by the provision of a perforate extension on the disc 13' projecting across the space between the lower ends of the outer pair of cylinders and a perforate disc arranged over the lower end of the central opening. The wall of insulating material prevents heat exchange between the vapors passing upwardly through the central passage and the external annular passage in which partial condensation is effected.

Identical dephlegmators of this type may be substituted for the dephlegmators illustrated in Fig. 1, in which case the vapor inlet connection to each dephlegmator will be direct without passing through the preceding dephlegmator.

It will be noted, in either type of dephlegmator construction illustrated, that the vapors entering the dephlegmator are uniformly distributed throughout an annular cooled passage in which they pass downwardly while undergoing condensation, that in the bottom of this passage the flow of uncondensed vapors is abruptly reversed, facilitating the separation of the downwardly moving particles or films of liquid condensate from the uncondensed vapors, that uniform distribution of the vapors is maintained and that the lighter uncondensed vapors escape upwardly through the central passage without further contact with the liquid condensate or the vapors undergoing condensation and without heat interchange therewith.

The piping connecting the dephlegmators and the still and vaporizing receptacles for carrying the vapors to and from the dephlegmators and returning the condensates formed therein may be insulated to prevent or reduce heat losses. The condensation within each dephlegmator may also be regulated, within limits, by shielding or partially insulating the external cooling surface of the chamber within which condensation is effected in the dephlegmator, particularly during cold weather.

A connection may be provided at the lower end of pipe 6 for withdrawing part of the vapors passing to each of the dephlegmators in the series where it is desired to subject a part of the vapors to separate treatment, or where the operation is effected as a batch process and it is desired to bypass a part of the vapors during part of the period of operation. This connection may be of the construction illustrated in Fig. 5, which is adapted to remove a part of the vapors and also to remove any liquid condensed within the pipes 6. In this construction, the vapors enter the chamber 32 through the connection 33, which communicates with the still or vaporizing receptacle, and pass about the baffle 34 upwardly through the pipe 6. Part of the vapors may be withdrawn through connection 35 and regulation of the part withdrawn may be effected by means of valve 36. The baffle 34 is arranged above an extension 37 of the pipe 33 into the chamber 32. Any condensate collecting in the pipe 6 is thus directed into the space about the projection 37 and may be withdrawn through the valved connection 38.

The primary still 1, is provided with a valved draw-off 40 and a connection for the introduction of fresh stock 41. Each of the vaporizing receptacles, B' and C', are also provided with valved draw-offs, 42 and 43 respectively, for the removal of residues or heavy fractions therefrom.

In carrying out the method of the invention as a batch operation in the apparatus illustrated, for example, for the production of gasoline from crude oil, crude oil is fed into the still 1 through connection 41 up to about 80% of the volumetric capacity of the still shell. Heat is then applied to the still and the vapors rise passing upwardly through the dome 2 and the pipe 6 communicating therewith into the condensing space between the outer two cylinders in the first dephlegmator A through the equalizing and distributing perforations in the pipe 11. The vapors pass downwardly between the cylinders 9 and 10 in the first dephlegmator A, undergoing partial condensation therein, the condensate being returned to the still 1 through back-trap connection 22, the uncondensed vapors escaping through the equalizing and distributing perforations in the disc 13 then upwardly through the space between cylinders 7 and 8 to the second dephlegmator B through connections 17 and 20 and the valve 19. In the second dephlegmator B, a second grading by partial condensation takes place in a similar manner, the condensate being returned to the revaporizing receptacle B' through connection 23 and the uncondensed vapors escaping through connection 21. The condensate is returned to the revaporizing receptacle B' while hot and at a temperature just below the critical point at which condensation takes place and is redistilled in the receptacle B' by the heat transferred through the walls of the vaporizing receptacle from the oil in the still but without coming in contact with the oil in the still. The light, uncondensed and clean vapors pass out through the connection 21 to the final condenser without further contacting with the condensate or the vapors undergoing condensation. The vapors of the revaporized condensate from the receptacle B' pass upwardly through connection 25, into the third dephlegmator C, in which a third grading by partial condensation takes place in a similar manner. The uncondensed or cleaned vapors from the third dephlegmator C escape through the apertures 26 into the vapor line to the final condenser. The condensate collected in the third dephlegmator C is returned to the vaporizing receptacle C' through connection 27 where it is again subjected to redistillation. The vapors from the condensate revaporized in the receptacle C' pass upwardly through connection 28 to the vapor line to the final condenser. The uncondensed vapors from the dephlegmators B and C and the vapors from the redistilling compartment C' are mingled in the vapor line 29 whence they pass to final condensation. As the distillation proceeds, the vapors escaping through the connection 29 gradually become heavier. By the use of suitable temperature measuring instruments, or by measuring the gravity of the condensate collected in the final condenser, the first cut is separately collected until the end boiling point of the desired gasoline fraction is reached, for example, 420° F. Thereafter the distillation may be continued for the production of illuminating oils or other fractions. The fractions so collected may be subjected to further treatment, and may be cracked for the further production of lighter distillates. The vapors of the heavier fractions may be subjected to vapor phase cracking, and for this purpose, it is advantageous to conduct the vapors from the still, either through connection 36 or through valved connection 18 by opening the valve 18 and closing the valve 19, directly to the vapor phase cracking apparatus without intermediate cooling.

In carrying out the method of the invention as a continuous operation in the apparatus illustrated, for the production of gasoline, the still charge is maintained by the introduction of fresh stock through the inlet 41, either continuously or intermittently, as the distillation proceeds. The fresh stock so introduced is advantageously preheated. To control the operation, the still may be equipped with suitable gauges to indicate the oil level and with temperature measuring instruments to indicate the thermal conditions prevailing in the still. By regulating the firing of the still, the character of the vapors escaping through the vapor line 29 is controlled. This regulation may be supplemented by regulation of the partial condensation effected in the dephlegmators, as before pointed out. The heavy residue collecting in the primary still 1 and the unvaporized residues or heavier fractions collecting in the vaporizing receptacles B' and C' are withdrawn as the operation progresses through connections 40, 42 and 43 respectively. In continuous operation, the connection 40 is advantageously equipped with an inverted U-pipe forming a trap to automatically maintain the desired oil level in the still, and the outlets 42 and 43 from the vaporizing receptacles B' and C' may be provided with traps to prevent the escape of vapors therefrom. The residue from the primary still, to which the residues from the redistilling compartments B' and C' may be added, may be conducted to a second still, while hot, in which the illuminating oil fraction or kerosene character fraction is separated. Supplementary stills may be employed for the separation of further fractions. For the separation of an illuminating oil cut and a gas oil cut, for example, the second still can be of the construction illustrated, and the third still for the separation of the gas oil fraction, may be an ordinary shell still. The vapors from the illuminating oil still and the gas oil still may be subjected without intermediate condensation, to vapor phase cracking treatment. Lubricating oil fractions may also be separated from the residues by further distillation. The fractionation of the crude oil into several cuts may likewise be effected in a single still of the character illustrated, and the several fractions withdrawn as unvaporized residues from the primary still 1 and each of the separate vaporizing receptacles.

It will be apparent, that additional redistillation compartments and additional dephlegmators may be employed, either to obtain a more accurate final cut, or for the purpose of obtaining in a single operation, a greater number of separate cuts or fractions.

It will thus be seen that this invention provides an improved process and apparatus which provides economy in operation in saving time and labor involved in redistillation for example over the customary redistillation with steam, while at the same time an accurate, sweet and clean fraction is obtained. Losses in condensation are reduced or eliminated, particularly as compared to the usual uncondensed steam still vapor loss. The lightest and cleanest vapors are immediately removed without being subjected to unnecessary heating, thereby avoiding losses through the formation of fixed gases or difficulty condensible vapors. The final product is effectively redistilled two or more times without the heat losses involved where each fraction is cooled before being subjected to redistillation, and the fractions redistilled and the redistilled vapors are kept free from contact with the oil or vapor from which they have been previously separated. Due to the plurality of fractional distillations and fractional condensations effected, the distillation may be pushed and high capacity obtained without detriment to the quality of the product obtained.

While the invention in particularly applicable to refining and separating gasoline character fractions and similar light fractions, it will be apparent that the invention may be employed in connection with the separation and treatment of heavier fractions, for example, kerosene or gas oil. From average crude oil of good quality, a clean sweet and water white gasoline fraction as distilled can be separated without chemical treatment.

I claim:

1. An improved method of distilling hydrocarbon oils, which comprises initially distilling the original oil, dephlegmating the vapors, redistilling the condensate obtained by this dephlegmation by heat interchange with the original oil undergoing distillation but without direct contact therewith, and collecting in a common receiver the uncondensed vapors from the dephlegmation and the vapors of the redistilled condensate obtained from the redistillation without contacting them with the oil being distilled, the said condensate, or the vapors undergoing dephlegmation.

2. An improved method of distilling hydrocarbon oils, which comprises initially distilling the original oil, dephlegmating the vapors, redistilling the condensate obtained by this dephlegmation by heat interchange with the original oil undergoing distillation but without direct contact therewith, and collecting in a common receiver the uncondensed vapors from the dephlegmation and the vapors of the redistilled condensate obtained from the redistillation without bringing them in contact or heat exchanging relation with the oil being distilled, the said condensate, or the vapors undergoing dephlegmation.

3. An improved method of distilling hydrocarbon oils, which comprises initially distilling the original oil, dephlegmating the vapors, redistilling the condensate obtained by this dephlegmation by heat interchange with the original oil undergoing distillation but without direct contact therewith, dephlegmating the vapors from the redistillation, redistilling the condensate from the second dephlegmation by heat interchange with the original oil undergoing distillation but without direct contact therewith, and collecting in a common receiver the uncondensed vapors from each dephlegmation and from the second redistillation without contacting them with the oil being distilled, the said condensates, or the vapors undergoing dephlegmation.

4. An improved method of distilling hydrocarbon oils, which comprises initially distilling the original oil, dephlegmating the vapors, redistilling the condensate so obtained by heat interchange with the original oil undergoing distillation but without direct contact therewith, dephlegmating the vapors from the redistillation, redistilling the condensate from the second dephlegmation by heat interchange with the original oil undergoing distillation but without direct contact therewith, and collecting in a common receiver the uncondensed vapors from each dephlegmation and from the second redistillation without bringing them in contact or heat exchanging relation with the oil being distilled, the said condensates, or the vapors undergoing dephlegmation.

5. An improved method of distilling hydrocarbon oils, which comprises initially distilling the original oil, dephlegmating the vapors, returning the condensate to the initial distillation, subjecting the uncondensed vapors to a second dephlegmation, redistilling the condensate obtained from the second dephlegmation by heat interchange with the original oil undergoing distillation but without direct contact therewith, and collecting in a common receiver the uncondensed vapors from the second dephlegmation and the vapors of the redistilled condensate without contacting them with the oil being distilled, the said condensates, or the vapors undergoing dephlegmation.

6. An improved apparatus for distilling hydrocarbon oils, comprising a still, a series of closed vaporizing receptacles within the still, a series of dephlegmators and means for conducting the vapors from the still and from each of the vaporizing receptacles except the last to one of the said dephlegmators, means for conducting the condensate from each dephlegmator to the next vaporizing receptacle in the series, a common receiver for vapors from the dephlegmators and the last vaporizing receptacle and means for collecting and removing the uncondensed vapors from each of the said dephlegmators and the vapors from the last vaporizing receptacle to said common receiver.

7. An improved apparatus for distilling hydrocarbon oils, comprising a shell still, a series of closed vaporizing receptacles within the still and below the normal liquid level therein, a series of dephlegmators, a connection between the vapor space of the still and the first dephlegmator, connections between the vapor space of one vaporizing receptacle other than the last and one of the said dephlegmators other than the first, connections for conducting condensate from each dephlegmator to the next vaporizing receptacle, and a common vapor line communicating with the last vaporizing receptacle and each of the said dephlegmators.

8. An improved apparatus for distilling hydrocarbon oils, comprising a shell still, a series of closed vaporizing receptacles within the still and below the normal liquid level therein and a series of dephlegmators, connections for conducting the liquid condensate from each of the dephlegmators to the next vaporizing receptacles, a separate dephlegmator communicating with the vapor space of the still having a connection for returning condensate to the still, a vapor connection between said last named dephlegmator and the first dephlegmator in said first named series, connections communicating with the vapor space of one of the vaporizing receptacles other than the last for conducting vapors to the next dephlegmator in the first named series, a common receiver for vapors from the dephlegmators and the last vaporizing receptacle, and connections for conducting away the vapors from the last vaporizing receptacle and from each of the dephlegmators in the first named series to said common receiver.

9. An improved apparatus for distilling hydrocarbon oils, comprising a still, a series of separate vaporizing receptacles within the still, a series of dephlegmators and means for conducting the vapors from the still and from each of the vaporizing chambers except the last to one of the said dephlegmators, means to conduct the condensate from each dephlegmator to the next vaporizing receptacle in the series, a common receiver for vapors from the dephlegmators and the last vaporizing receptacle, means to collect and remove the uncondensed vapors from each of the dephlegmators and from the last vaporizing receptacle to said common receiver, and a dephlegmator interposed in the vapor connection between the still and the first dephlegmator of said series having a connection for returning condensate to the still.

10. An improved method of distilling hydrocarbon oils, which comprises initially distilling the original oil, dephlegmating the vapors, redistilling the condensate obtained by this dephlegmation by heat interchange with the original oil undergoing distillation but without direct contact therewith and collecting in a common receiver and subjecting to final condensation the uncondensed vapors from the dephlegmation and the vapors of the revaporized condensate from the redistillation without contacting them with the oil being distilled, the said condensate, or the vapors undergoing dephlegmation.

In testimony whereof I affix my signature.

WILLIAM EDGAR CHENOT.

Certificate of Correction.

It is hereby certified that in Letters Patent No. 1,584,730, granted May 18, 1926, upon the application of William Edgar Chenot, of Belleville, Illinois, for an improvement in "Methods and Apparatus for Distillation," an error appears in the printed specification requiring correction as follows: Page 2, strike out line 41 and insert instead *the second dephlegmator to the first reva-;* and that the said Letters Patent should be read with this correction therein that the same may conform to the record of the case in the Patent Office.

Signed and sealed this 13th day of July, A. D. 1926.

[SEAL.]
M. J. MOORE,
*Acting Commissioner of Patents.*